(12) United States Patent
Goodwin et al.

(10) Patent No.: US 8,906,460 B2
(45) Date of Patent: Dec. 9, 2014

(54) COMPOSITION FOR USE AS $NO_x$ REMOVING TRANSLUCENT COATING

(75) Inventors: Graham Goodwin, Cleethorpes (GB); John Stratton, Cleethorpes (GB); Robert McIntyre, Highfields (GB)

(73) Assignee: Cristal USA Inc., Hunt Valley, MA (US)

( * ) Notice: Subject to any disclaimer, the term of this patent is extended or adjusted under 35 U.S.C. 154(b) by 521 days.

(21) Appl. No.: 12/562,500

(22) Filed: Sep. 18, 2009

(65) Prior Publication Data

US 2010/0009085 A1 Jan. 14, 2010

Related U.S. Application Data

(63) Continuation-in-part of application No. 10/587,339, filed on Sep. 7, 2006.

(51) Int. Cl.
| | | |
|---|---|---|
| *C01C 3/02* | (2006.01) | |
| *B01J 23/00* | (2006.01) | |
| *B01J 21/18* | (2006.01) | |
| *B01J 27/20* | (2006.01) | |
| *B01J 21/00* | (2006.01) | |
| *B01J 20/00* | (2006.01) | |
| *C09K 3/18* | (2006.01) | |
| *C09D 1/00* | (2006.01) | |
| *C04B 41/50* | (2006.01) | |
| *C04B 41/49* | (2006.01) | |
| *B01J 35/00* | (2006.01) | |
| *C09D 183/04* | (2006.01) | |
| *B01J 37/02* | (2006.01) | |
| *C08K 3/22* | (2006.01) | |
| *C08K 3/26* | (2006.01) | |

(52) U.S. Cl.
CPC ............... *B01J 35/004* (2013.01); *C08K 3/22* (2013.01); *C09D 183/04* (2013.01); *C08K 3/26* (2013.01); *B01J 37/0215* (2013.01)
USPC ........ 427/372.2; 502/350; 502/174; 502/242; 502/411; 106/13; 106/286.4; 106/286.7; 106/287.1; 106/287.14

(58) Field of Classification Search
USPC .......... 502/350, 174, 242, 411; 106/13, 286.4, 106/286.6, 287.1, 286.7, 287.14; 427/372.2
See application file for complete search history.

(56) References Cited

U.S. PATENT DOCUMENTS

| | | | |
|---|---|---|---|
| 5,658,841 | A | 8/1997 | Tanaka et al. |
| 6,165,256 | A | 12/2000 | Hayakawa et al. |
| 6,228,480 | B1 | 5/2001 | Kimura et al. |
| 6,306,796 | B1 * | 10/2001 | Suzue et al. .................. 502/350 |
| 6,673,433 | B1 | 1/2004 | Saeki et al. |
| 2002/0077251 | A1 | 6/2002 | Okusako et al. |
| 2005/0118434 | A1 | 6/2005 | Hasskerl et al. |
| 2006/0078712 | A1 | 4/2006 | Thierauf et al. |
| 2009/0192252 | A1 | 7/2009 | Stration et al. |

FOREIGN PATENT DOCUMENTS

| | | |
|---|---|---|
| EP | 0901991 | 3/1999 |
| EP | 0923988 | 6/1999 |
| EP | 1118385 | 7/2001 |
| JP | 10180118 | 10/1998 |
| JP | 10212809 | 11/1998 |
| JP | 2004315727 A1 | 11/2004 |
| JP | 2007/522923 | 8/2007 |
| JP | 2008/513188 | 5/2008 |
| WO | 9707069 | 2/1997 |
| WO | 9710186 | 3/1997 |
| WO | 9841480 | 9/1998 |
| WO | 2005082810 A1 | 9/2005 |
| WO | WO 2006030250 A2 * | 3/2006 |
| WO | 2009097004 A1 | 8/2009 |
| WO | PCT/US2010/048865 | 6/2011 |
| WO | PCT/US10/048865 | 3/2012 |

OTHER PUBLICATIONS

Ichiura, H., T. Kitaoka, and H. Tanaka, "Photocatalytic oxidation of NOx using composite sheets containing TiO2 and a metal compound," Chemosphere 51 (2003), pp. 855-860.*

Ke, Yuzhang et al., "Preparation of Titania Coating on Ceramic Surface for Anti-Fouling, Deodorization, and Sterilization"; 2001; (abstract only).

* cited by examiner

*Primary Examiner* — Anthony J Zimmer
(74) *Attorney, Agent, or Firm* — Dunlap Codding, P.C.

(57) ABSTRACT

An improved composition capable of forming a translucent coating on a construction material surface comprising at least:

a) photocatalytic titanium dioxide particles having at least a de-$NO_x$ activity;

b) a silicon based-material in which said particles are dispersed, wherein said silicon based material includes at least one polysiloxane; and c) particles having a de-$HNO_3$ activity selected from calcium carbonate, magnesium carbonate and mixtures thereof.

11 Claims, No Drawings

COMPOSITION FOR USE AS NO$_x$ REMOVING TRANSLUCENT COATING

CROSS REFERENCE TO RELATED APPLICATIONS

This application is a continuation-in-part of U.S. application Ser. No. 10/587,339, filed Jan. 30, 2004, the contents of which are hereby expressly incorporated herein by reference.

STATEMENT REGARDING FEDERALLY SPONSORED RESEARCH OR DEVELOPMENT

Not applicable.

BACKGROUND OF THE INVENTION

The present invention relates to compositions having photocatalytic self-cleaning properties for use as translucent coatings on construction material surfaces, and, more particularly, the present invention relates such improved compositions having high de-HNO$_3$ activity.

In the field of buildings and coatings, the pollution of the environment raises a serious problem of contamination of exterior materials for buildings and outdoor buildings. Dust and particles floating in the air deposit on the roof and the outer wall of buildings in fine weather. Upon exposure to rainfall, the deposits flow together with rainwater and flow down along the outer wall of the building. As a result, the contaminant adheres along the course of the rainwater. As the surface dries, soil appears in a stripe pattern.

To solve at least in part this problem, it has already been proposed to deposit a coating on construction material surfaces. Alternatively, said coating furthermore exhibits photocatalytic self-cleaning properties towards atmospheric contaminants. Thus, titanium oxide photocatalytic coatings are disclosed in EP 0901 991, WO 97/07069, WO 97/10186 and WO 98/41480.

Ultraviolet radiation (for example from UV light) to a semiconductor, such as titanium oxide, generates electrons having a strong reduction activity and positive holes having a strong oxidation activity which can ultimately initiate the degradation of harmful organic compounds into harmless substances. Typical atmospheric contaminants are for example, nitrogen oxides, ozone and organic pollutants adsorbed on the coated surface of the materials. This is particularly advantageous in built-up areas, for example, in city streets, where the concentration of organic contaminants may be relatively high, especially in intense sunlight, but where the available surface area of materials is also relatively high.

However, one problem associated with so-formed oxidized species, like HNO$_3$, formed from the reaction of NO$_2$ and NO with TiO$_2$/UV light in the presence of water and oxygen, is their absorption on the coated surface of the material which may then over time cause problems with difficult-to-remove stains and/or corrosion.

Accordingly, there is still a need for a coating composition having a significant improvement in decontamination properties, non staining ability and outstanding durability over prior coatings.

Surprisingly, the inventors have discovered that such a purpose could be efficiently achieved by a specific composition for use as a coating.

Accordingly, an object of the present invention is to provide a composition which, when applied as a coating on a surface of a material, exhibits improved NO$_x$ and optionally VOC$_x$ (i.e., Volatile Organic Content, like xylene and benzene) removing properties.

Another object of the present invention is to provide a composition which can impart such properties without sacrificing the translucency of the coating.

Still another object of the present invention is to provide a composition which, when applied as a coating on the surface of a material, can easily release the contaminant therefrom, in particular by rainfall or by washing with water. Specifically, the composition, when applied to the surface of a substrate to form a thin film, enables a contaminant or derivative thereof adhered onto the surface to be easily washed away with water.

SUMMARY OF THE INVENTION

According to one aspect, the instant invention is directed to a NO$_x$ removing composition for use as a translucent coating on construction material surfaces, comprising at least:

a) photocatalytic titanium dioxide particles having at least a de-NO$_x$ activity, b) particles having a de-HNO$_3$ activity, and c) a silicon based-material, in which are dispersed said particles, wherein said photocatalytic particles have a crystalline size ranging from 1 nm to 50 nm and particles a) and b) are present in an amount lower than 20% by weight of the total weight of said composition.

According to another aspect, the instant invention relates to a method for imparting self-cleaning properties towards atmospheric contaminants at the surface of a material, said method comprising at least the steps of:

applying a composition according to the invention onto the surface of a material, and drying or curing the said composition to provide a translucent coating system.

According to yet another aspect, the instant invention is an improved composition capable of forming a translucent coating on a construction material surface, comprising at least:

a) photocatalytic titanium dioxide particles having at least a de-NO$_x$ activity and consisting essentially of at least 50% by mass of an anatase crystalline form, said particles having a mean size range of from 1 nm up to 150 nm and a surface area per gram of at least 30 m$^2$/g, and b) a silicon based-material in which both of said a) particles are dispersed, wherein said silicon based material includes at least one polysiloxane derivative having the formula

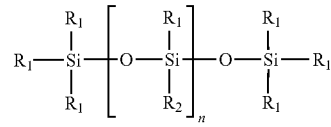

wherein
R$_1$ and R$_2$ are alkyl radicals of from 1 to 20 carbon atoms or phenyl, and the improvement comprises incorporating into said composition particles c) having a de-HNO$_3$ activity selected from calcium carbonate, magnesium carbonate and mixtures thereof wherein (i) particles of a) and c) are present in an amount lower than 20% by weight of the total weight of said composition; (ii) the ratio of particles c) having a de-HNO$_3$ activity to photocatalytic particles a) is in the range of from 0.05:2 to 0.2:0.8, and (iii) the particles having a de-HNO$_3$ activity and the photocatalytic titanium dioxide particles are not in intimate contact with one another.

DETAILED DESCRIPTION OF THE INVENTION

The present invention resides in the discovery of an improved composition that is capable of forming a translucent thin film coating on a construction material surface. The composition comprises at least:

a) photocatalytic titanium dioxide particles having at least a de-$NO_x$ activity and consisting essentially of at least 50% by mass of an anatase crystalline form, said particles having a mean size range of from 1 nm up to 150 nm and a surface area per gram of at least 30 $m^2/g$, and b) a silicon based-material in which both of said a) particles are dispersed, wherein said silicon based material includes at least one polysiloxane derivative having the formula

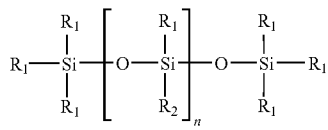

wherein $R_1$ and $R_2$ are alkyl radicals of from 1 to 20 carbon atoms or phenyl. The discovery, or improvement, comprises incorporating into the composition particles c) having a de-$HNO_3$ activity and selected from calcium carbonate, magnesium carbonate and mixtures thereof, with the proviso that (i) particles of a) and c) are present in an amount lower than 20% by weight of the total weight of the composition; (ii) the ratio of particles c) having a de-$HNO_3$ activity to photocatalytic particles a) is in the range of from 0.05:2 to 0.2:0.8, and (iii) the particles having a de-$HNO_3$ activity and the photocatalytic titanium dioxide particles are not in intimate contact with one another.

Photocatalytic Titanium Dioxide Particles:

The composition according to the present invention comprises at least dispersed photocatalytic titanium dioxide particles having at least a de-$NO_x$ activity with $NO_x$ meaning NO and/or $NO_2$. According to a specific embodiment, said photocatalytic particles also exhibit a de-VOC activity.

In the present description, the term "de-$NO_x$" and/or "de-VOC" activity refers to an ability to transform $NO_x$ and/or VOC species to their respective oxidized species, like $HNO_3$ for $NO_x$.

Specifically, in the present invention, the term "photocatalytic particles" used herein refers to particles based on a material which, when exposed to light (excitation light) having higher energy (i.e., shorter wavelength) than the energy gap between the conduction band and the valence band of the crystal, can cause excitation (photo excitation) of electrons in the valence band to produce a conduction electron and a valence hole.

The photocatalytic titanium dioxide particles contained in the composition according to the present invention basically include anatase and rutile forms of titanium oxide and mixtures thereof, although anatase-type titanium oxide is especially preferred for its high photoactivity.

For the titanium dioxide particles of the coating, the nature of the particle is, preferably, predominantly the anatase crystalline form. "Predominantly" means that the level of anatase in the titanium dioxide particles of the coating composition is greater than 50% by mass. The particles of the coating composition preferably exhibit a level of anatase of greater than 80%.

The degree of crystallization and the nature of the crystalline phase are measured by X-ray diffraction.

The crystalline titanium dioxide particles incorporated in the coating exhibit a mean size ranging from 1 nm to 150 nm, preferably ranging from 2 nm to 30 nm, more preferably still from 5 nm to 20 nm. The diameters are measured by transmission electron microscopy (TEM) and also XRD.

The preferred photocatalyst particles have a high surface area per gram, e.g., higher than 30 $m^2/g$, preferably above 50 $m^2/g$ and most preferably greater than about 100 $m^2/g$ as measured by the BET method.

In contrast, the surface area per gram of conventional $TiO_2$ pigments, i.e., having non-photocatalytic properties, is about 1-30 $m^2/g$. The difference in the much smaller particles and crystallites of the photocatalyst particles gives rise to a much higher surface area.

Particularly convenient for the invention are the photocatalytic $TiO_2$ sold under the name S5-300B by Millennium Inorganic Chemicals Ltd.

The particles having a photocatalytic activity are added in an amount of 0.1 to 15, preferably 1 to 12, and most preferably 2 to 10, % by weight (expressed in dry matter) of the total weight of said composition.

In particular, the composition according to the invention includes at least 5% by weight of photocatalytic particles.

According to a specific embodiment, photocatalytic particles may also exhibit a de-VOC removing property.

The photocatalytic titanium dioxide particles may be used as a sol prepared by dispersion in water, as a water- or solvent-containing paste, or as a powder. Preferred examples of the dispersant used to prepare a sol include water, alcohols such as methanol, ethanol, isopropanol, n-butanol and isobutanol, and ketones such as methyl ethyl ketone and methyl isobutyl ketone.

De-$HNO_3$ Particles:

The improved composition according to the present invention is based on including into the composition an amount of dispersed particles for removing the oxidized species $HNO_3$, formed photocatalytically from $NO_x$ particles. These second type of particles are called "$HNO_3$ removing particles" or "de-$HNO_3$ particles".

Illustrative examples of de-$HNO_3$ particles include basic compounds, in particular any insoluble carbonates and, for example, calcium carbonate, zinc carbonate, magnesium carbonate and mixtures thereof. Especially preferred examples of such compounds include calcium carbonate. No particular limitation is imposed on its amount, but the amount should be sufficient to achieve the transformation of $HNO_3$ to its alkaline salt and, secondarily, be compatible with the coating including it. An amount of 0.05 to 15, in particular of 0.1 to 2, % by weight (expressed in dry matter) of the total weight of said composition may be particularly convenient.

The ratio de-$HNO_3$ particles/photocatalytic particles may vary from 0.05 to 2, in particular from 0.1 to 1 and more particularly from 0.2 to 0.8.

Said particles i.e., de-$HNO_3$ particles and photocatalytic particles are included in the composition according to the invention in an amount lower than 20% by weight (expressed in dry matter), in particular lower than 15% by weight, and more particularly lower than 12% by weight of the total weight of the composition.

Silicon-based Component:

The composition of the present invention contains a silicon-based component wherein at least previously disclosed particles are entrapped.

Specifically, in the present invention, the term "silicon-based material" used herein refers to any material based on silica or a mixture thereof, which is able to provide a silicon based-film convenient for coating.

The silicon based-material advantageously provides a polysiloxane polymer film.

According to one embodiment, the silicon based-material includes at least one polysiloxane derivative, and, in particular, having the formula (I):

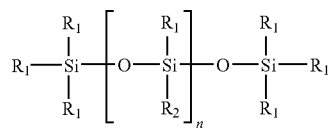

wherein n has a value to provide an aqueous dispersion of polysiloxane having weight percentage solid ranging from 40-70%, and $R_1$ and $R_2$ are alkyl radicals of 1 to 20 carbon atoms or an aryl group such as phenyl.

Typically, the value of n ranges from about 50 to 2000.

Illustrative $R_1$ and $R_2$ radicals are alkyl groups (e.g., methyl, ethyl, propyl, butyl, 2-ethylbutyl, octyl), cycloaklyl groups (e.g., cyclohexyl, cyclopentyl), alkenyl groups (e.g., vinyl, hexenyl, allyl), aryl groups (e.g., phenyl, tolyl, xylyl, naphthyl, diphenyl) aralkyl groups (e.g., benzyl, phenylethyl), any of the foregoing groups in which some or all of the hydrogens bonded to the carbons have been substituted (such as with halogen atoms or cyano), or groups substituted with or containing, for example, amino groups, ether groups (-O-), carbonyl groups (—CO—), carboxyl groups (—COOH) or sulfonyl groups (—$SO_2$—) (e.g., chloromethyl, trifluoropropyl, 2-cyanoethyl, 3-cyanopropy).

Particularly convenient for the instant invention are polysiloxanes sold under the trademark WACKER BS 45 by the firm WACKER-Chemie GmbH.

The content of the polysiloxane in the composition according to the present invention may be suitably determined.

The composition according to the present invention may include at least a solvent.

Examples of solvents usable herein include water, an organic solvent, and a mixed solvent composed of water and an organic solvent. Water and alcohol are particularly preferred solvents.

The composition according to the present invention may contain optional components provided that such an addition does not compromise the shelf life, UV durability, translucency or non-staining properties. Examples of such additional compounds include filler(s) like quartz, calcite, clay, talc, barite and/or Na—Al-silicate; pigments like $TiO_2$, lithopone, and other inorganic pigments; dispersants like polyphosphates, polyacrylates, phosphonates, naphthene and lignin sulfonates; wetting agents like anionic, cationic, amphoteric and non-ionic surfactants; defoamers, like silicon emulsions; hydrocarbons; long-chain alcohols; stabilizers, like mostly cationic compounds; coalescent agents, like alkali-stable esters, glycols; rheological additives, like cellulose derivatives (CMC, HEC), xanthane gum, polyurethane, polyacrylate, modified starch, bentone and other lamellar silicates; water repellents like alkyl siliconates, siloxanes, wax emulsion, fatty acid Li salts and conventional fungicide or biocide.

The composition of the present invention may be applied onto the surface of the material to be coated by any suitable method, and examples of suitable methods include spray coating, dip coating, flow coating, spin coating, roll coating, brush coating, and sponge coating.

The composition, after the application onto the surface of the substrate, is dried or cured to form a thin film. The term "dried or cured" used herein means that the silicon based-material contained in the composition according to the present invention is converted to a silicon based film, and drying may be performed by either air drying or heat drying. Alternatively, ultraviolet irradiation or the like may be conducted to cause polymerization so far as the precursor is converted to a silicon film.

The composition according to the present invention may be applied on the surface of a high variety of materials.

The material is not particularly limited, and examples thereof include metals, ceramics, glasses, plastics, woods, stones, cements, concretes, fibers, woven fabrics, and combinations and laminates of the above materials. Specific examples to which the composition may be applied include housings, building materials; exterior of the buildings; interior of the buildings; sashes; windowpanes; structural materials; exterior of machineries and articles; dustproof covers and coatings; and films, sheets and seals.

In preparing the preferred embodiments of the present invention, various alternatives may be used to facilitate the objectives of the invention.

The following examples are presented to aid in an understanding of the present invention and are not intended to, and should not be construed to, limit the invention in any way. All alternatives, modifications and equivalents which may becomes obvious to those of ordinary skill in the art upon a reading of the present disclosure are included within the scope of the invention.

EXAMPLES

Paints were prepared by using the following materials:

$TiO_2$ (24% w/w): $TiO_2$ S5-300B from Millennium Inorganic Chemicals Sodium silicate: Sodium silicate soln. Grade Crystal 79 from Ineos. 386 g/l as $SiO_2$ diluted to 183 g/l, U3 (21% w/w): Precipitated calcium carbonate from Solvay Grade U3 dispersed in water to 21% solids content, 1% MR: Hydroxy ethyl cellulose Natrosol MR from Hercules Incorporated 1% solution in water, Foamaster NXZ: Antifoam from Cognis, Wacker BS45: Polysiloxane polymer latex from Wacker Chemie GmbH, Texanol: 2,2,4 trimethyl-1,3 pentanediol monoisobutyrate from Eastman Chemical Company.

The paints were prepared in two parts termed A and B.

For part A, the $TiO_2$ sol was diluted with water to which was then added the sodium silicate, calcium carbonate followed by the hydroxyethylcellulose and antifoam.

The components were mixed under high shear.

For part B, the water was added to the polysiloxane polymer, and the pH of this was then adjusted to 10.0 followed by the addition of the sodium silicate. Part A was then mixed with part B under high shear mixing. Lastly, the Texanol was added.

The compositions of so-prepared paints are listed below in Table I.

TABLE I

|  | F1 | F2 | F3 | F4 | F5 | F6 | F7 |
|---|---|---|---|---|---|---|---|
| PART A | | | | | | | |
| $TiO_2$* (% wt) | 19.7 | 27.0 | 17.70 | 24.30 | 30.10 | 8.80 | 27.40 |
| $CaCO_3$* (% wt) | 0 | 0 | 13.60 | 12.50 | 11.60 | 27.20 | 21.30 |
| Sodium silicate (% wt) | 1 | 1.3 | 0.9 | 1.2 | 1.5 | 0.4 | 1.4 |
| Hydroxyethyl Cellulose (% wt) | 1 | 1 | 1 | 1 | 1 | 1 | 1 |
| Antifoam (% w) | 0.06 | 0.06 | 0.06 | 0.06 | 0.06 | 0.06 | 0.06 |
| Water (% wt) | 9.6 | 7.5 | 6.2 | 4.5 | 3.2 | 5.1 | 1.1 |
| PART B | | | | | | | |
| Water (% wt) | 9.6 | 7.5 | 6.2 | 4.5 | 3.2 | 5.1 | 1.1 |
| Sodium silicate (% wt) | 1 | 1.3 | 0.9 | 1.2 | 1.5 | 0.4 | 1.4 |
| Polysiloxane (% wt). | 24.2 | 20.8 | 19.2 | 16.4 | 14.2 | 17.9 | 11.2 |
| Texanol (% w) | 1.2 | 1 | 1.0 | 0.8 | 0.7 | 0.9 | 0.6 |

$TiO_2$* - Solids content of sol was 24% w/w
$CaCO_3$* - Solids content of sol was 21% w/w The percentages stated in the table are the percentages expressed in commercial product (i.e., to dry matter+solvent)

$NO_x$ measurements were made on paint films that were 10 cm by 1 cm prepared on a Melinex (Mylar®) substrate.

The $NO_x$ that is used is NO at 30 ppm. After the initial measurement, the paint films were irradiated with 55 W/m² UV in the range of 300 to 400 nm range for 18 hours using a filtered Xenon light source. For the $NO_x$ measurements, the samples were irradiated with a UV fluorescent tube which emits 10 W/m² UV in the range of 300 to 400 nm.

The equipment, products and methods used for determining of $NO/NO_2$ removal by the coating are as follows:
1. Equipment
   Nitrogen Oxides Analyser SIGNAL 4000
   UV Lamp Model VL-6LM 365 and 312 nanometer wavelength exBDH
   Air-tight sample chamber
   3 channel gas mixer
   ex Brooks Instruments, Holland
2. Gases
   NO Nitric Oxide
   $NO_2$ Nitrogen Dioxide
   $NO_x$ Mixture NO and $NO_2$
   Compressed air containing water vapor.
3. Method
   The method of measure was as follows:
   1. Switch on Analyser and exhaust pump. Ensure exhaust pipe goes to
   The atmosphere.
   2. Allow to warm-up. Several internal components need to reach operating temperature before the analyzer will begin operation. The process will, typically, take 60 min from cold start and the message START-UP SEQUENCE ACTIVE will be displayed until operating conditions are met.
   3. After warm-up, turn on air and test gas supply to the gas mixer.
   4. Calibrate the Analyser on the Test gas supply only, (turn the air channel to zero on the gas mixer), according to the manufacturer's instructions.
   5. After calibration, turn OFF the test gas supply at the gas mixer.
   6. Place test sample in the test chamber and seal chamber.
   7. Turn on both air and test gas and adjust each until required level of test gas is reached, shown by the Analyser output. RECORD level.
   8. Switch on the UV lamp when test gas levels are at desired point.
   9. Allow the irradiated sample value to reach equilibrium, typically up to 5 min.
   10. RECORD the value shown on the analyser.
   11. Report "Initial Value" i.e. no UV, "Final Value" after UV exposure for set period, Δ Value i.e. Initial–Final and % reduction i.e., Δ value/initial value×100.

The results are shown below in Table II.

TABLE II

|  | % NO removal |
|---|---|
| F1 | 3.6 |
| F2 | 4.0 |
| F3 | 6.0 |
| F4 | 10.9 |
| F5 | 9.0 |
| F6 | 4.9 |
| F7 | 14.3 |

What is claimed is:

1. A composition capable of forming a translucent coating on a construction material surface, comprising:
   a) photocatalytic titanium dioxide particles having a de-$NO_x$ activity, the photocatalytic titanium dioxide particles consisting essentially of at least 50% by mass of an anatase crystalline form having a mean size range of from 1 nm up to 150 nm and a surface area per gram of at least 30 m²/g,
   b) a silicon based-material in which said photocatalytic titanium dioxide particles are dispersed, wherein said silicon based material includes at least one polysiloxane derivative having the formula

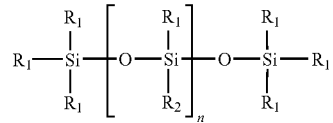

wherein
$R_1$ and $R_2$ are alkyl radicals of from 1 to 20 carbon atoms or phenyl, and
   c) de-$HNO_3$ particles having a de-$HNO_3$ activity, wherein the de-$HNO_3$ particles are selected from the group consisting of calcium carbonate, magnesium carbonate and mixtures thereof, wherein
      (i) the photocatalytic titanium dioxide particles and the de-$HNO_3$ particles are present in an amount lower than 20% by weight of the total weight of said composition, and the photocatalytic titanium dioxide particles are present in an amount of at least 5% by weight of the total weight of said composition,
      (ii) the ratio of de-$HNO_3$ particles to photocatalytic titanium dioxide particles is in the range of from 0.05 to 2.

2. The composition according to claim 1, wherein the photocatalytic titanium dioxide particles exhibit a mean size from 5 nm to 20 nm.

3. The composition according to claim 1, wherein the photocatalytic titanium dioxide particles are present in an amount up to 15% by weight (as expressed in dry matter) of the total weight of said composition.

4. The composition according to claim 1 further including a solvent.

5. A method for imparting self-cleaning properties against $NO_x$ and $HNO_3$ atmospheric contaminants on a surface of a material, said method comprising applying onto the surface of said material a composition according to claim 1, and drying or curing the composition on the surface to obtain a thin film coating thereon thereby imparting de-$NO_x$ and de-$HNO_3$ properties to the surface of the material.

6. A composition capable of forming a translucent coating on a construction material surface, comprising:
   a) photocatalytic titanium dioxide particles having a de-$NO_x$ activity, the photocatalytic titanium dioxide particles consisting essentially of at least 80% by mass of an anatase crystalline form having a mean size range of from 1 nm up to 150 nm and a surface area per gram of at least 30 m²/g,
   b) a silicon based-material in which said photocatalytic titanium dioxide particles are dispersed, wherein said silicon based material includes at least one polysiloxane derivative having the formula

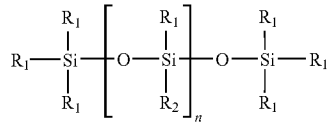

wherein
$R_1$ and $R_2$ are alkyl radicals of from 1 to 20 carbon atoms or phenyl, and
   c) de-$HNO_3$ particles having a de-$HNO_3$ activity, wherein the de-$HNO_3$ particles are selected from the group consisting of calcium carbonate, magnesium carbonate and mixtures thereof, wherein
      (i) the photocatalytic titanium dioxide particles and the de-$HNO_3$ particles are present in an amount lower than 20% by weight of the total weight of said composition, and the photocatalytic titanium dioxide particles are present in an amount of at least 5% by weight of the total weight of said composition; and
      (ii) the ratio of de-$HNO_3$ particles to photocatalytic titanium dioxide particles is in the range of from 0.05 to 2.

7. An improved translucent thin film adhered to a construction material surface, comprising:
   a) photocatalytic titanium dioxide particles having at least a de-$NO_x$ activity, the photocatalytic titanium dioxide particles consisting essentially of at least 80% by mass of an anatase crystalline form, said photocatalytic titanium dioxide particles having a mean size range of from 1 nm up to 150 nm and a surface area per gram of at least 30 m²/g,
   b) a silicon based-material in which said photocatalytic titanium dioxide particles are dispersed, wherein said silicon based material includes at least one polysiloxane derivative having the formula

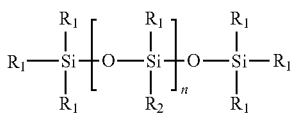

wherein
$R_1$ and $R_2$ are alkyl radicals of from 1 to 20 carbon atoms or phenyl, and
   c) de-$HNO_3$ particles having a de-$HNO_3$ activity, wherein the de-$HNO_3$ particles are selected from the group consisting of calcium carbonate, magnesium carbonate and mixtures thereof wherein
      (i) the photocatalytic titanium dioxide particles and the de-$HNO_3$ particles are present in the dispersion in an amount lower than 20% by weight of the total weight of said dispersion, and the photocatalytic titanium dioxide particles are present in an amount of at least 5% by weight of the total weight of said dispersion; and
      (ii) the ratio of de-$HNO_3$ particles to photocatalytic titanium dioxide particles is in the range of from 0.05 to 2.

8. The composition according to claim 6, wherein the photocatalytic titanium dioxide particles exhibit a mean size from 5 nm to 20 nm.

9. The composition according to claim 6, wherein the photocatalytic titanium dioxide particles are present in an amount up to 15 % by weight (as expressed in dry matter) of the total weight of said composition.

10. The composition according to claim 6 further including a solvent.

11. A method for imparting self-cleaning properties against $NO_x$ and $HNO_3$ atmospheric contaminants on a surface of a material, said method comprising applying onto the surface of said material a composition according to claim 6, and drying or curing the composition on the surface to obtain a thin film coating thereon thereby imparting de-$NO_x$ and de-$HNO_3$ properties to the surface of the material.

* * * * *

UNITED STATES PATENT AND TRADEMARK OFFICE
CERTIFICATE OF CORRECTION

| | | |
|---|---|---|
| PATENT NO. | : 8,906,460 B2 | Page 1 of 1 |
| APPLICATION NO. | : 12/562500 | |
| DATED | : December 9, 2014 | |
| INVENTOR(S) | : Graham Goodwin, John Stratton and Robert McIntyre | |

It is certified that error appears in the above-identified patent and that said Letters Patent is hereby corrected as shown below:

On the Title Page:
Under (63) Related U.S. Application Data: Delete "Sep. 7, 2006" and replace with
-- Jan. 30, 2004 --

Signed and Sealed this
Seventh Day of April, 2015

Michelle K. Lee
*Director of the United States Patent and Trademark Office*